US012803455B2

(12) United States Patent
Liu

(10) Patent No.: US 12,803,455 B2
(45) Date of Patent: Nov. 17, 2026

(54) POWER CONVERSION DEVICE WITH CASCADE POWER SWITCH

(71) Applicant: Power Forest Technology Corporation, Hsinchu County (TW)

(72) Inventor: Chia-Hsien Liu, Hsinchu County (TW)

(73) Assignee: Power Forest Technology Corporation, Hsinchu County (TW)

(*) Notice: Subject to any disclaimer, the term of this patent is extended or adjusted under 35 U.S.C. 154(b) by 135 days.

(21) Appl. No.: 18/662,993

(22) Filed: May 13, 2024

(65) Prior Publication Data

US 2025/0300570 A1 Sep. 25, 2025

(30) Foreign Application Priority Data

Mar. 21, 2024 (TW) ................................ 113202806

(51) Int. Cl.
*H02M 7/00* (2006.01)
*H02M 3/00* (2006.01)

(52) U.S. Cl.
CPC ........... *H02M 7/003* (2013.01); *H02M 3/003* (2021.05)

(58) Field of Classification Search
CPC .............................. H02M 3/003; H02M 7/003
See application file for complete search history.

(56) References Cited

U.S. PATENT DOCUMENTS

2015/0200583 A1* 7/2015 Huang .................. H02M 3/158 327/109
2021/0408891 A1* 12/2021 Yao ......................... H02M 1/08
2024/0178831 A1* 5/2024 Qu .......................... H02M 1/08

* cited by examiner

*Primary Examiner* — Alex Torres-Rivera
(74) *Attorney, Agent, or Firm* — JCIPRNET

(57) ABSTRACT

A power conversion device is provided. The power conversion device includes a power switch circuit and a control circuit. The power switch circuit includes a power switch and a cascode switch. The power switch is implemented by a depletion-type gallium nitride (GaN) field-effect transistor. A first terminal of the power switch is coupled to a high-voltage terminal of the power conversion device. A first terminal of the cascode switch is coupled to a second terminal of the power switch. The control circuit is coupled to the power switch circuit. The control circuit and the cascode switch are integrated in a first die. The power switch is integrated in a second die. A withstand voltage capability of the second die is higher than a withstand voltage capability of the first die.

9 Claims, 9 Drawing Sheets

POWER CONVERSION DEVICE WITH CASCADE POWER SWITCH

CROSS-REFERENCE TO RELATED APPLICATION

This application claims the priority benefit of Taiwan application serial no. 113202806, filed on Mar. 21, 2024. The entirety of the above-mentioned patent application is hereby incorporated by reference herein and made a part of this specification.

BACKGROUND OF THE INVENTION

Field of the Invention

The invention relates to a power conversion device, and in particular, to a power conversion device having high withstand voltage capability.

Description of Related Art

Current power conversion devices may convert AC power into output power. In general, the power conversion device includes a power switch and a control circuit. The power conversion device utilizes the switching operation of the power switch to perform the power conversion operation of the power conversion device. In designs applied to high voltage (e.g., greater than 600 volts) requirements, the control circuit is integrated (or packaged) in a die that meets low withstand voltage capability. The power switch needs to be integrated into a die that meets high withstand voltage capability. Based on the above design, the power switch may be implemented by a depletion-type gallium nitride (GaN) field-effect transistor. Therefore, the power conversion device may utilize another switch to control the switching operation of the power switch. This switch is integrated in other dies. Therefore, the power conversion device includes three dies from different processes in total.

It should be noted that a plurality of bonding wires are needed to connect the dies. Therefore, the greater the number of dies, the larger the size of the power conversion device. Given the low size design requirements, the power conversion device may not accommodate three dies. Therefore, under the demand of high voltage, how to reduce the number of dies or reduce the size of the power conversion device is one of the research focuses of those skilled in the art.

SUMMARY OF THE INVENTION

The invention provides a power conversion device having high voltage requirements and small size.

A power conversion device of the invention includes a power switch circuit and a control circuit. The power switch circuit includes a power switch and a cascode switch. The power switch is implemented by a depletion-type gallium nitride (GaN) field-effect transistor. A first terminal of the power switch is coupled to a high-voltage terminal of the power conversion device. A first terminal of the cascode switch is coupled to a second terminal of the power switch. The control circuit is coupled to the power switch circuit. The control circuit and the cascode switch are integrated in a first die. The power switch is integrated in a second die. A withstand voltage capability of the second die is higher than a withstand voltage capability of the first die.

In an embodiment of the invention, the cascade switch is implemented by an enhancement-type field-effect transistor.

In an embodiment of the invention, a second terminal of the cascade switch is coupled to a control terminal of the power switch. A control terminal of the cascade switch is coupled to the control circuit.

In an embodiment of the invention, the control circuit generates a control signal and provides the control signal to the control terminal of the cascade switch.

In an embodiment of the invention, the cascade switch performs a switching operation of the power switch circuit in response to a duty cycle of the control signal.

In an embodiment of the invention, the power conversion device further includes a safety capacitor and a charge and discharge control circuit. The safety capacitor is coupled to the first terminal of the power switch. The charge and discharge control circuit includes a discharge circuit. The discharge circuit is coupled to the second terminal of the power switch and the control circuit. The discharge circuit performs a discharge operation on a voltage value located at the safety capacitor. The discharge circuit is integrated in the first die.

In an embodiment of the invention, the charge and discharge control circuit further includes a charging circuit. The charging circuit is coupled to the second terminal of the power switch and the control circuit. The charging circuit performs a charging operation on the voltage value located at the safety capacitor. The charging circuit is integrated in the first die.

In an embodiment of the invention, a control terminal of the power switch is coupled to the control circuit. A control terminal of the cascade switch receives an enable signal.

In an embodiment of the invention, the control circuit generates a control signal and the enable signal, and provides the enable signal to the control terminal of the cascade switch.

In an embodiment of the invention, the cascade switch is turned on in response to the enable signal. The power switch performs the switching operation of the power switch circuit in response to the control signal.

Based on the above, the power conversion device includes the power switch circuit and the control circuit. The power switch circuit includes the power switch and the cascode switch. The control circuit and the cascode switch are integrated in the first die. The power switch is integrated in the second die. The withstand voltage capability of the second die is higher than the withstand voltage capability of the first die. The second die is produced by a process rule that meets high withstand voltage capability. The first die is produced by a process rule that meets low withstand voltage capability. Therefore, the charge and discharge control circuit of the invention does not need to be integrated in an additional die. The number of dies in the power conversion device may be reduced. In this way, under the requirement of high voltage, the size of the power conversion device may be reduced.

DESCRIPTION OF THE EMBODIMENTS

Figure 1:
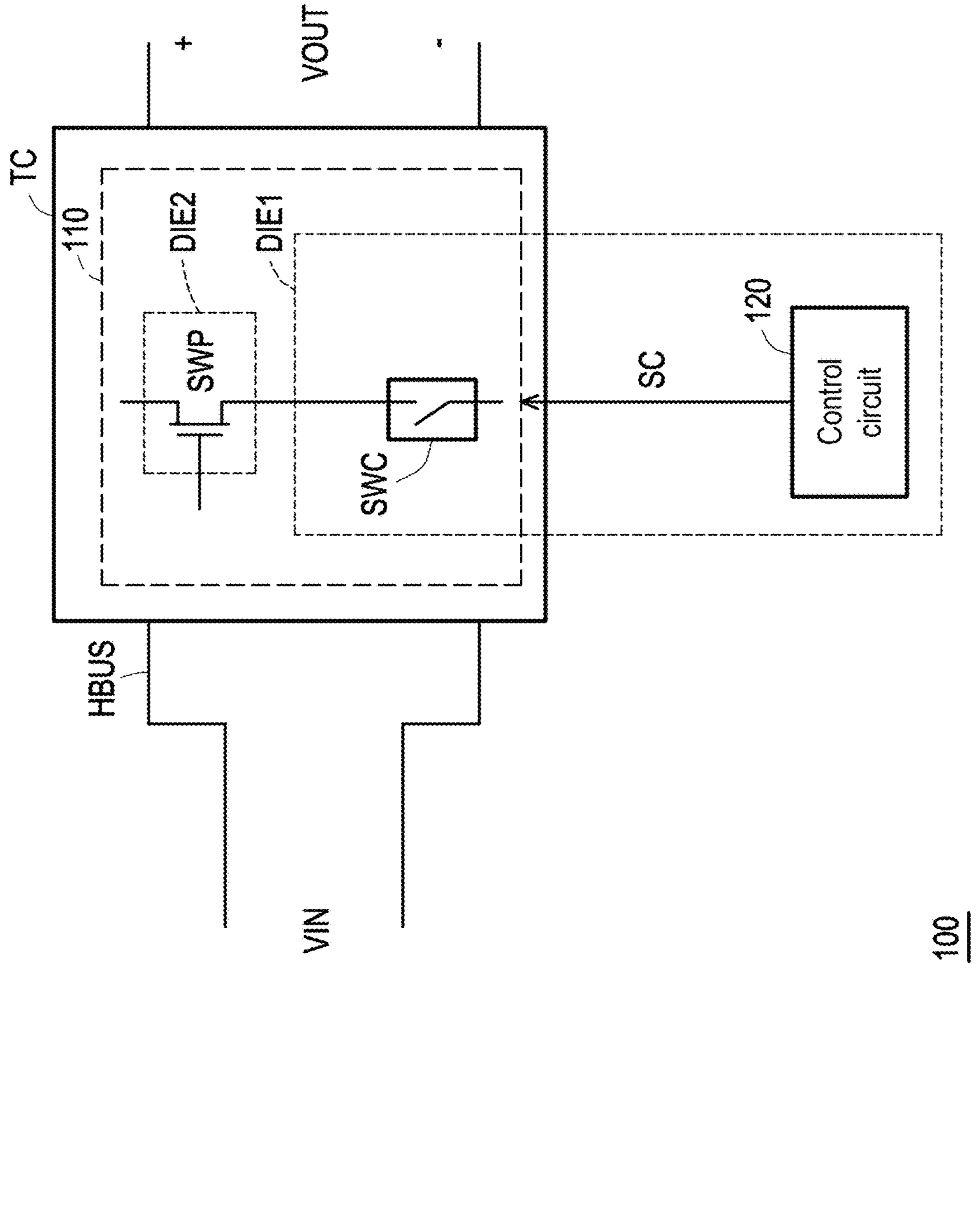
FIG. 1 is a schematic diagram of a power conversion device shown according to an embodiment of the invention.

A portion of the embodiments of the invention is described in detail hereinafter with reference to figures. In the following, the same reference numerals in different figures should be considered to represent the same or similar elements. The embodiments are only a part of the invention, and do not disclose all possible implementation modes of the invention. Rather, the embodiments are merely examples within the scope of the invention.

Please refer to FIG. 1. FIG. 1 is a schematic diagram of a power conversion device shown according to an embodiment of the invention. In the present embodiment, a power conversion device 100 includes a power switch circuit 110 and a control circuit 120. The power switch circuit 110 includes a power switch SWP and a cascode switch SWC. The power switch SWP is implemented by a depletion-type gallium nitride (GaN) field-effect transistor. The first terminal of the power switch SWP is coupled to a high-voltage terminal HBUS of the power conversion device 100. The first terminal of the cascode switch SWC is coupled to the second terminal of the power switch SWP. In other words, the power switch SWP and the cascade switch SWC are connected in series in a cascode manner. In the present embodiment, the control circuit 120 is coupled to the power switch circuit 110. The control circuit 120 may control the switching operation of the power switch circuit 110 using a control signal SC.

For example, the power switch circuit 110 is disposed in a conversion circuit TC (however, the invention is not limited thereto). The power switch SWP receives an input power VIN via the high-voltage terminal HBUS. Therefore, the conversion circuit TC may receive the input power VIN via the high-voltage terminal HBUS and convert the input power VIN into an output power VOUT. The power conversion device 100 may be any type of power converter known to those skilled in the art.

For another example, the power switch circuit 110 further includes a rectifier circuit (not shown). The power switch SWP is coupled to the rectifier circuit via the high-voltage terminal HBUS (however, the invention is not limited thereto). Therefore, the conversion circuit TC may receive the rectified power from the rectifier circuit via the high-voltage terminal HBUS and convert the rectified power into the output power VOUT.

In the present embodiment, the control circuit 120 and the cascade switch SWC are integrated or packaged in a first die DIE1. The power switch SWP is integrated or packaged in a second die DIE2. The withstand voltage capability of the second die DIE2 is higher than the withstand voltage capability of the first die DIE1. Therefore, the power switch SWP has higher withstand voltage capability. For example, the power switch SWP may withstand a voltage difference greater than 600 volts.

In the present embodiment, the first die DIE1 is produced by a process rule that meets low withstand voltage capability. The second die DIE2 is produced by a process rule that meets high withstand voltage capability. It is worth mentioning here that the power switch SWP is integrated in the second die DIE2. The power switch SWP may withstand greater a voltage difference. Therefore, the withstand voltage capability of the cascade switch SWC may be allowed to be reduced. The control circuit 120 and the cascode switch SWC are integrated in the first die DIE1. Therefore, the cascade switch SWC of the invention does not need to be integrated in an additional die. The number of dies in the power conversion device 100 may be reduced. In this way, under the requirement of high voltage, the size of the power conversion device 100 may be reduced.

Figure 2:
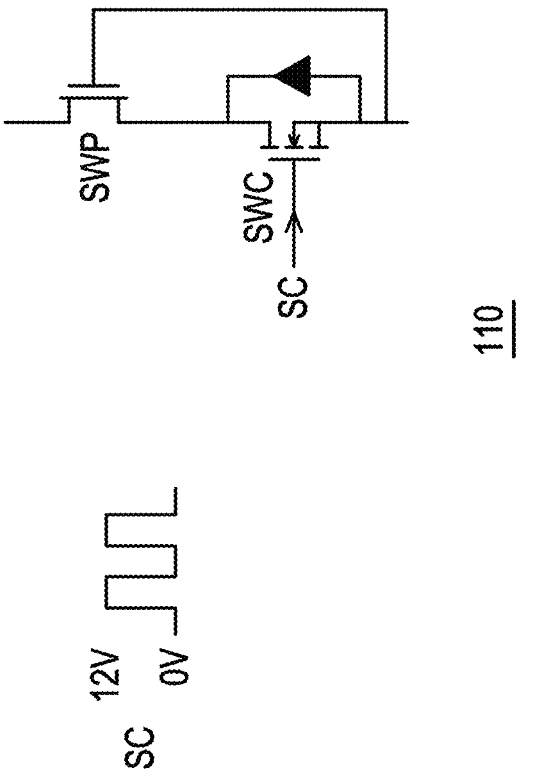
FIG. 2 is a circuit schematic diagram of a power switch circuit shown according to an embodiment of the invention.

Please refer to FIG. 1 and FIG. 2. FIG. 2 is a circuit schematic diagram of a power switch circuit shown according to an embodiment of the invention. In the present embodiment, the power switch SWP is implemented by a depletion-type GaN field-effect transistor. The cascade switch SWC is implemented by an enhancement-type field-effect transistor. The first terminal of the power switch SWP is coupled to the high-voltage terminal HBUS of the power conversion device 100. The first terminal of the cascode switch SWC is coupled to the second terminal of the power switch SWP. The second terminal of the cascode switch SWC is coupled to the control terminal of the power switch SWP. The control terminal of the cascade switch SWC is coupled to the control circuit 120.

In the present embodiment, the second terminal of the cascade switch SWC is coupled to the low-voltage terminal (not shown) of the power conversion device 100.

In the present embodiment, the control circuit 120 generates the control signal SC. The control circuit 120 provides the control signal SC to the control terminal of the cascade switch SWC. The control signal SC may be a pulse-width modulation (PWM) signal having a duty cycle. Therefore, the cascade switch SWC performs the switching operation of the power switch circuit 110 in response to the duty cycle of the control signal SC.

In the present embodiment, the cascade switch SWC is implemented by an N-type enhancement-type field-effect transistor. Therefore, the control signal SC has a positive pulse wave. The high voltage value of the positive pulse wave is, for example, 12 volts, but the invention is not limited thereto.

Figure 3:
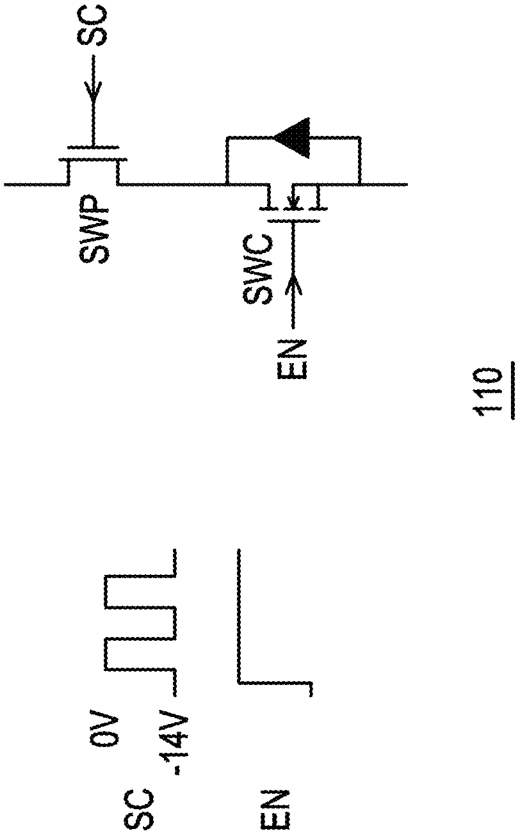
FIG. 3 is a circuit schematic diagram of a power switch circuit shown according to an embodiment of the invention.

Please refer to FIG. 1 and FIG. 3. FIG. 3 is a circuit schematic diagram of a power switch circuit shown according to an embodiment of the invention. In the present embodiment, the power switch SWP is implemented by a depletion-type GaN field-effect transistor. The cascade switch SWC is implemented by an enhancement-type field-effect transistor. The first terminal of the power switch SWP is coupled to the high-voltage terminal HBUS of the power conversion device 100. The first terminal of the cascode switch SWC is coupled to the second terminal of the power switch SWP. The control terminal of the power switch SWP is coupled to the control circuit 120. The control terminal of the cascade switch SWC is coupled to the control circuit 120.

The second terminal of the cascade switch SWC is coupled to the low-voltage terminal (not shown) of the power conversion device 100.

In the present embodiment, the control circuit 120 generates the control signal SC. The control circuit 120 provides the control signal SC to the control terminal of the power switch SWP. The cascade switch SWC is turned on in response to an enable signal EN. The control signal SC may be a pulse-width modulation (PWM) signal having a duty cycle. Therefore, the power switch SWP performs the switching operation of the power switch circuit 110 in response to the control signal SC.

In some embodiments, the enable signal EN may be provided by the control circuit 120.

In the present embodiment, the cascade switch SWC is implemented by an N-type enhancement-type field-effect transistor. Therefore, the voltage value of the enable signal EN is a positive voltage value. The control signal SC has a negative pulse wave. The low voltage value of the negative pulse wave is, for example, −14 volts, but the invention is not limited thereto.

Figure 4:
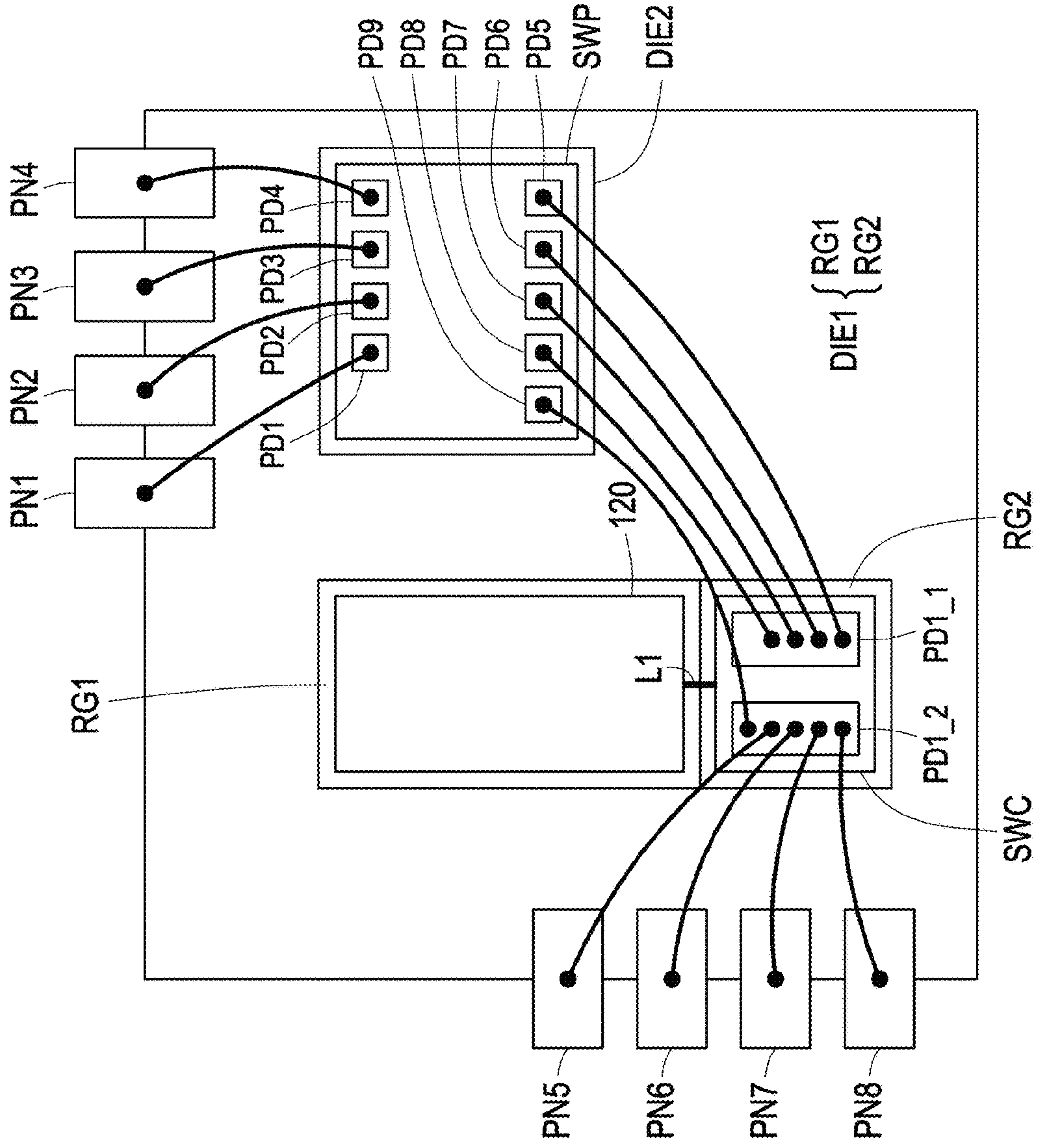
FIG. 4 is a schematic diagram of the die layout of a power conversion device shown according to an embodiment of the invention.

Please refer to FIG. 1 and FIG. 4. FIG. 4 is a schematic diagram of the die layout of a power conversion device shown according to an embodiment of the invention. In the present embodiment, the die layout of the present embodiment may be applied to the power switch circuit 110 shown in FIG. 2. The first die DIE1 and the second die DIE2 are packaged in a circuit element. The first die DIE1 includes the control circuit 120 and the cascade switch SWC. In other words, the control circuit 120 and the cascode switch SWC are respectively integrated in the first die DIE1. Further, the control circuit 120 is integrated in a region RG1 of the first die DIE1. The cascade switch SWC is integrated in a region RG2 of the first die DIE1.

The second die DIE2 includes the power switch SWP. In other words, the power switch SWP is integrated in the second die DIE2.

In the present embodiment, the first die DIE1 at least includes pads PD1_1 and PD1_2. The second die DIE2 at least includes pads PD2_1 to PD2_9. The first terminal of the power switch SWP is coupled to the high-voltage terminal HBUS via at least one of the pads PD2_1 to PD2_4 and at least one of pins PN1 to PN4 of the circuit element. The second terminal of the power switch SWP is coupled to the first terminal of the cascade switch SWC via at least one of the pads PD2_5 to PD2_8 and the pad PD1_1. The second terminal of the cascade switch SWC is coupled to at least one of the pins PN5 to PN8 of the circuit element via the pad PD1_2. In addition, the second terminal of the cascade switch SWC is also coupled to the control terminal of the power switch SWP via the pad PD1_2 and the pad PD2_9.

In the first die DIE1, the control circuit 120 may provide the control signal SC to the control terminal of the cascade switch SWC via an electrical connection structure L1 in the first die DIE1. The control circuit 120 does not need to provide the control signal SC via additional pads and bonding wires. The cascade switch SWC and the control circuit 120 are highly integrated into the circuit element. Therefore, the parasitic inductance, the parasitic capacitance, and the resistance caused by the bonding wires may be ignored. The risk of distortion of the control signal SC may be reduced. In addition, the packaging cost and the complexity of the power conversion device 100 may be reduced.

Figure 5:
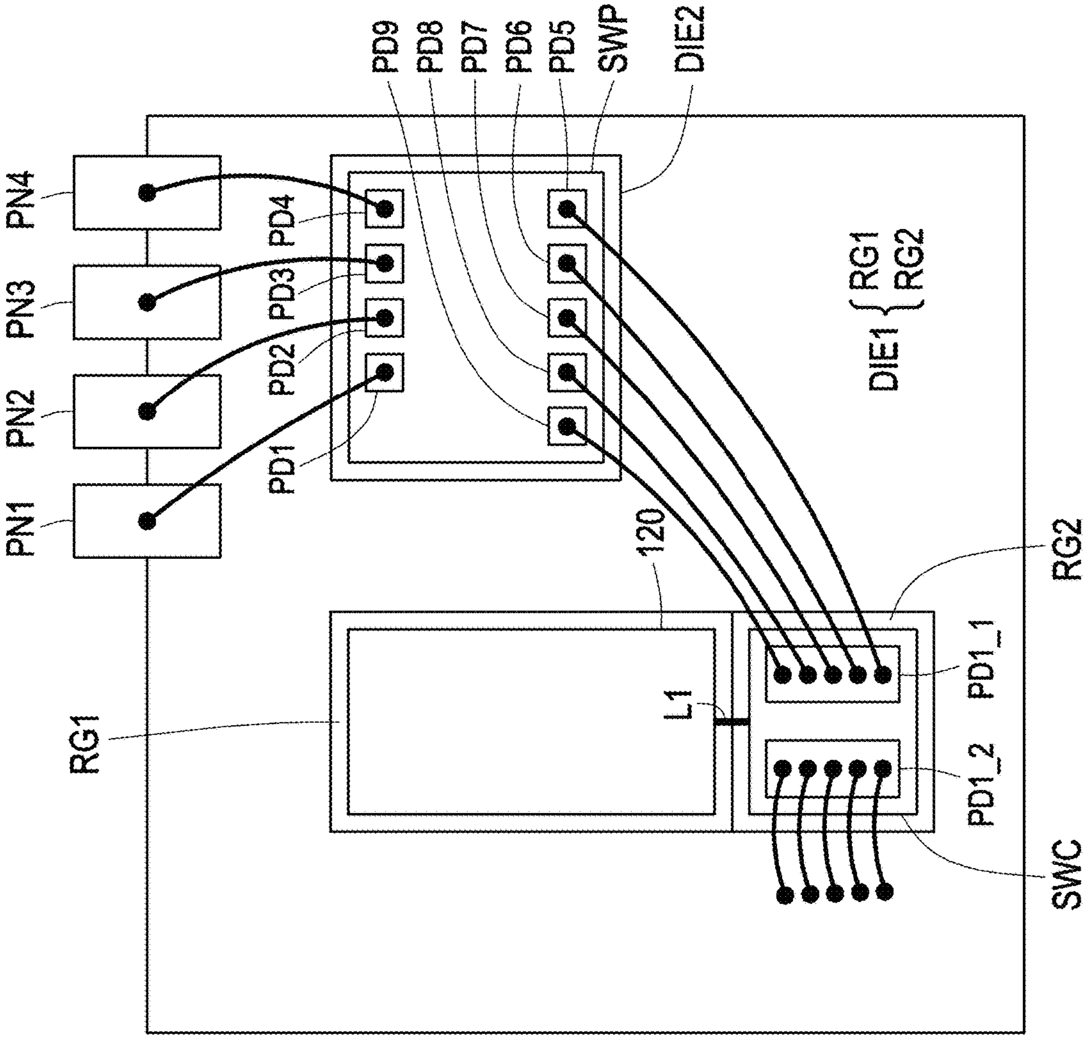
FIG. 5 is a schematic diagram of the die layout of a power conversion device shown according to an embodiment of the invention.

Please refer to FIG. 1 and FIG. 5. FIG. 5 is a schematic diagram of the die layout of a power conversion device shown according to an embodiment of the invention. The first die DIE1 and the second die DIE2 are packaged in a circuit element. The first die DIE1 includes the control circuit 120 and the cascade switch SWC. The control circuit 120 is integrated in the region RG1 of the first die DIE1. The cascade switch SWC is integrated in the region RG2 of the first die DIE1. The second die DIE2 includes the power switch SWP. In other words, the power switch SWP is integrated in the second die DIE2.

In the present embodiment, the first die DIE1 at least includes the pads PD1_1 and PD1_2. The second die DIE2 at least includes the pads PD2_1 to PD2_9. The first terminal of the power switch SWP is coupled to the high-voltage terminal HBUS via at least one of the pads PD2_1 to PD2_4 and at least one of the pins PN1 to PN4 of the circuit element. The second terminal of the power switch SWP is coupled to the first terminal of the cascade switch SWC via at least one of the pads PD2_5 to PD2_9 and the pad PD1_1. The second terminal of the cascade switch SWC is coupled to the electrical connection structure in the first die DIE1 via the pad PD1_2. The control circuit 120 provides the control signal SC to the control terminal of the cascade switch SWC via the electrical connection structure L1 in the first die DIE1.

In some embodiments, the control circuit 120 provides the enable signal EN to the control terminal of the cascade switch SWC via the electrical connection structure L1 in the first die DIE1 and provides the control signal SC to the control terminal of the power switch SWP located in the second die DIE2.

Figure 6:
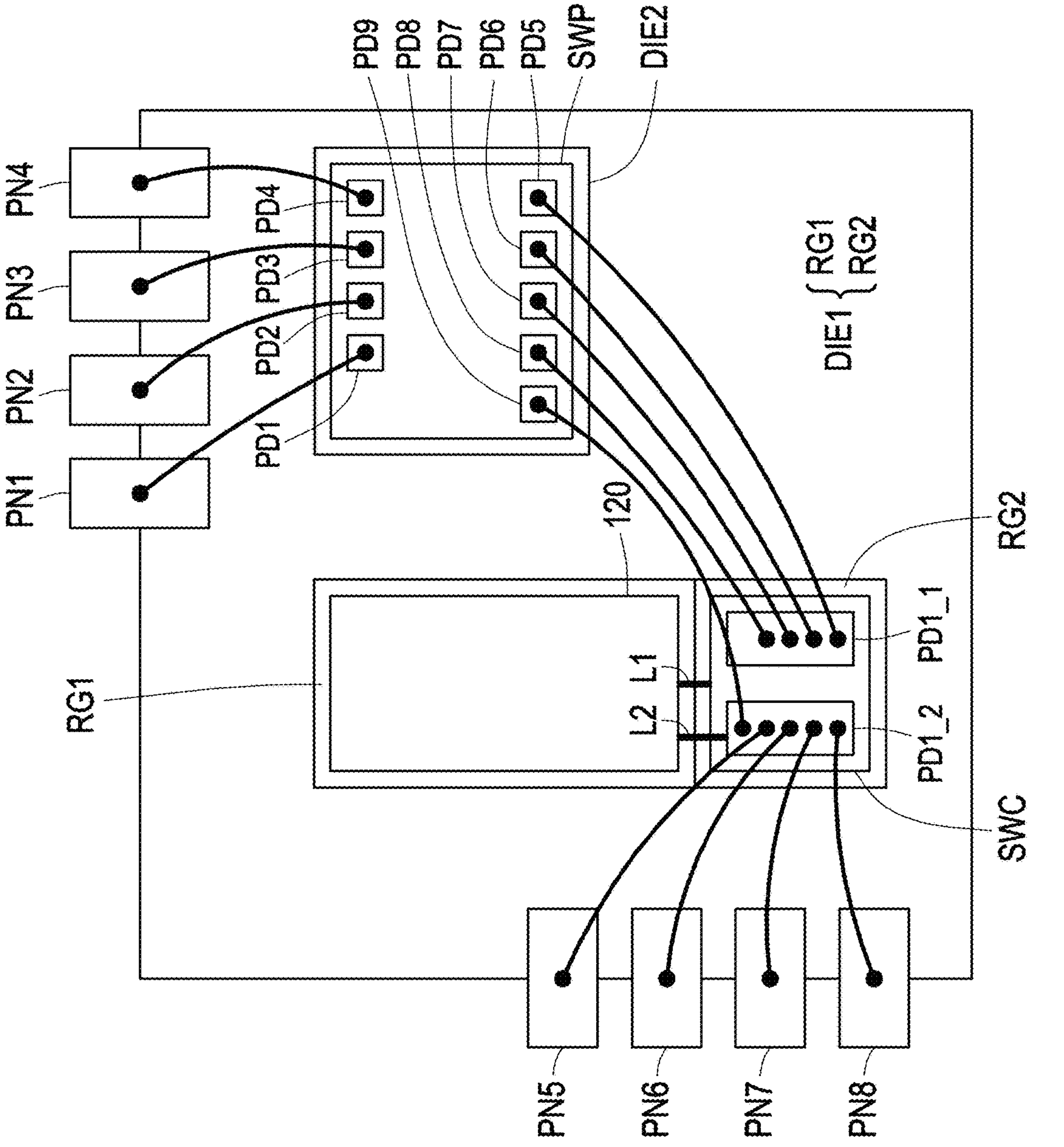
FIG. 6 is a schematic diagram of the die layout of a power conversion device shown according to an embodiment of the invention.

Please refer to FIG. 1 and FIG. 6. FIG. 6 is a schematic diagram of the die layout of a power conversion device shown according to an embodiment of the invention. The difference from the embodiment of FIG. 4 is that in the first die DIE1, the control circuit 120 may provide the control signal SC to the control terminal of the cascade switch SWC via the electrical connection structure L1 in the first die DIE1. The control circuit 120 is also connected to the pad PD1_2 via an electrical connection structure L2 in the first die DIE1. Therefore, the control circuit 120 may sense the current value flowing through the cascade switch SWC via the second terminal of the cascade switch SWC and the pad PD1_2. The control circuit 120 may perform over-current protection according to sensing the current value flowing through the cascade switch SWC.

Figure 7:
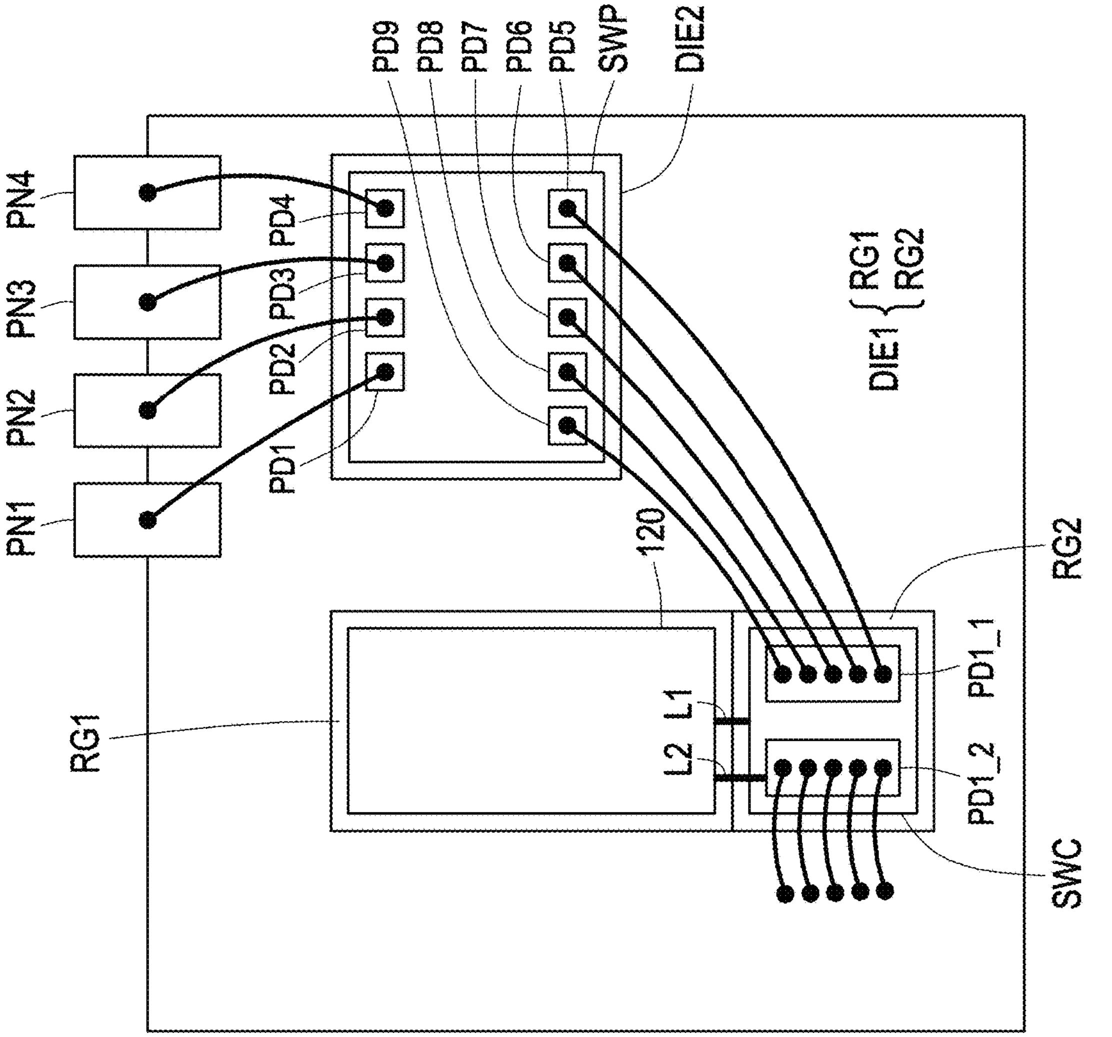
FIG. 7 is a schematic diagram of the die layout of a power conversion device shown according to an embodiment of the invention.

Please refer to FIG. 1 and FIG. 7. FIG. 7 is a schematic diagram of the die layout of a power conversion device shown according to an embodiment of the invention. The difference from the embodiment of FIG. 5 is that in the first die DIE1, the control circuit 120 may provide the control signal SC to the control terminal of the cascade switch SWC via the electrical connection structure L1 in the first die DIE1. The control circuit 120 is also connected to the pad PD1_2 via the electrical connection structure L2 in the first die DIE1. Therefore, the control circuit 120 may sense the current value flowing through the cascade switch SWC via the second terminal of the cascade switch SWC and the pad PD1_2. The control circuit 120 may perform over-current protection according to sensing the current value flowing through the cascade switch SWC.

Figure 8:
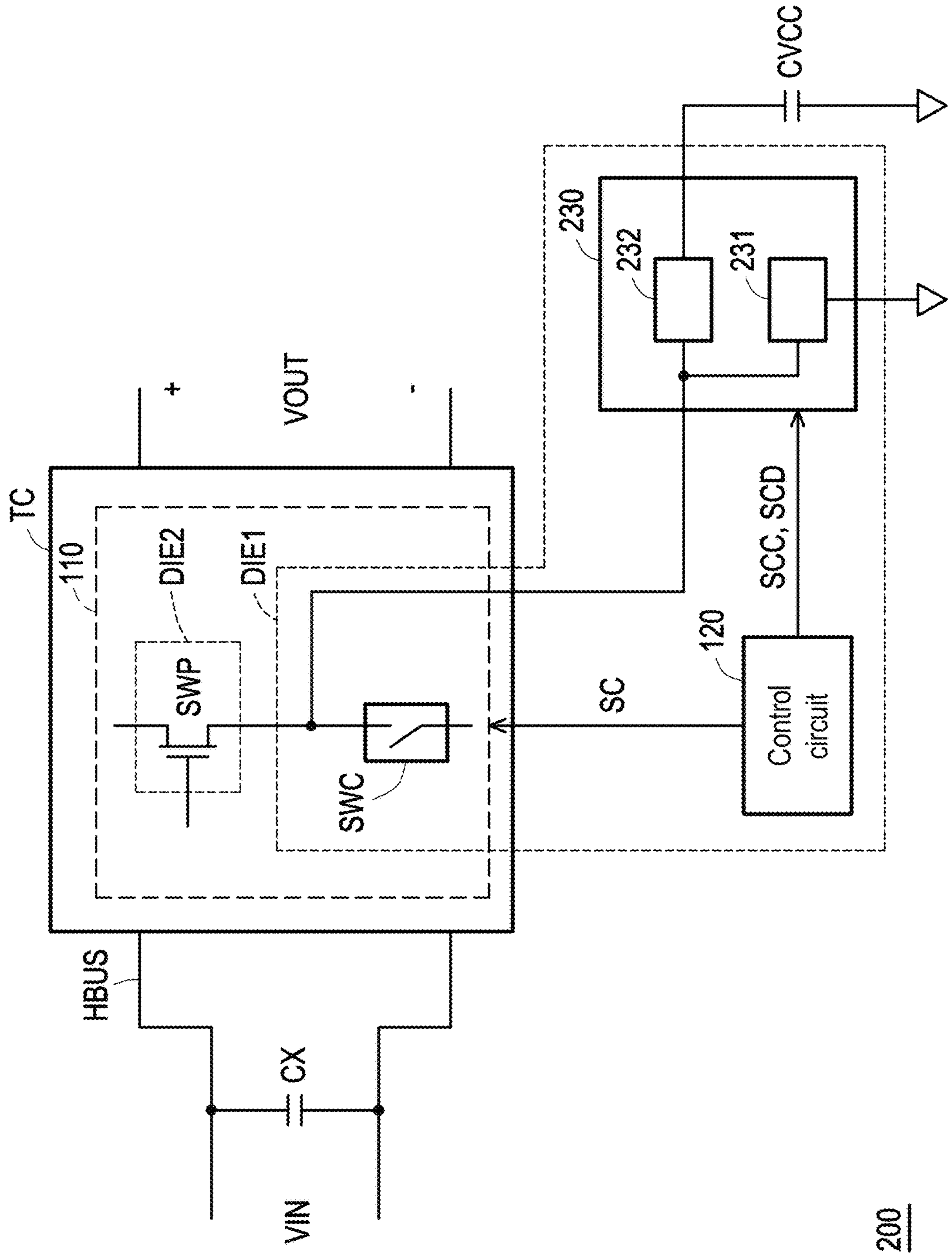
FIG. 8 is a schematic diagram of a power conversion device shown according to an embodiment of the invention.

Please refer to FIG. 8. FIG. 8 is a schematic diagram of a power conversion device shown according to an embodiment of the invention. In the present embodiment, the power conversion device 200 includes a safety capacitor (or X capacitor) CX, the power switch circuit 110, the control circuit 120, and a charge and discharge control circuit 230. The power switch circuit 110 is disposed in the conversion circuit TC. The power switch circuit 110 includes the power switch SWP and the cascode switch SWC. In the present embodiment, the implementation of the power switch SWP and the cascade switch SWC is clearly explained in the embodiments of FIG. 1 to FIG. 7, and is therefore not repeated here.

In the present embodiment, the safety capacitor CX is coupled to the first terminal of the power switch SWP. Furthermore, the safety capacitor CX may be coupled to the first terminal of the power switch SWP via the high-voltage terminal HBUS. The charge and discharge control circuit 230 includes a discharge circuit 231 and a charging circuit 232. The discharge circuit 231 is coupled to the second terminal of the power switch SWP and the control circuit 120. The discharge circuit 231 performs a discharge operation on the voltage value located at the safety capacitor CX. The charging circuit 232 is coupled to the second terminal of the power switch SWP and the control circuit 120. The charging circuit 232 performs a charging operation on the voltage value located at the safety capacitor CX.

The cascade switch SWC, the control circuit 120, the discharge circuit 231, and the charging circuit 232 are integrated or packaged in the first die DIE1. Furthermore, the control circuit 120, the discharge circuit 231, and the charging circuit 232 are integrated or packaged in the region RG1 of the first die DIE1. The cascade switch SWC is integrated or packaged in the region RG2 of the first die DIE1. The power switch SWP is integrated or packaged in the second die DIE2. The withstand voltage capability of the second die DIE2 is higher than the withstand voltage capability of the first die DIE1.

The control circuit 120 may control the discharge circuit 231 using a control signal SCD. When the power conversion device 100 does not receive an AC power VIN, the discharge circuit 231 is controlled to discharge the voltage value of the safety capacitor CX. When the discharge circuit 231 discharges the voltage value of the safety capacitor CX, the discharge circuit 231 may pull down the voltage value of the safety capacitor CX using a low reference voltage (e.g., ground).

The control circuit 120 may control the charging circuit 232 using a control signal SCC. When the power conversion device 100 just receives an AC power VAC, the charging circuit 232 is controlled to charge the voltage value located at the safety capacitor CX. When the charging circuit 232 charges the voltage value located at the safety capacitor CX, the charging circuit 232 may charge the voltage value located at the safety capacitor CX using the electrical energy stored in a capacitor CVCC.

Figure 9:
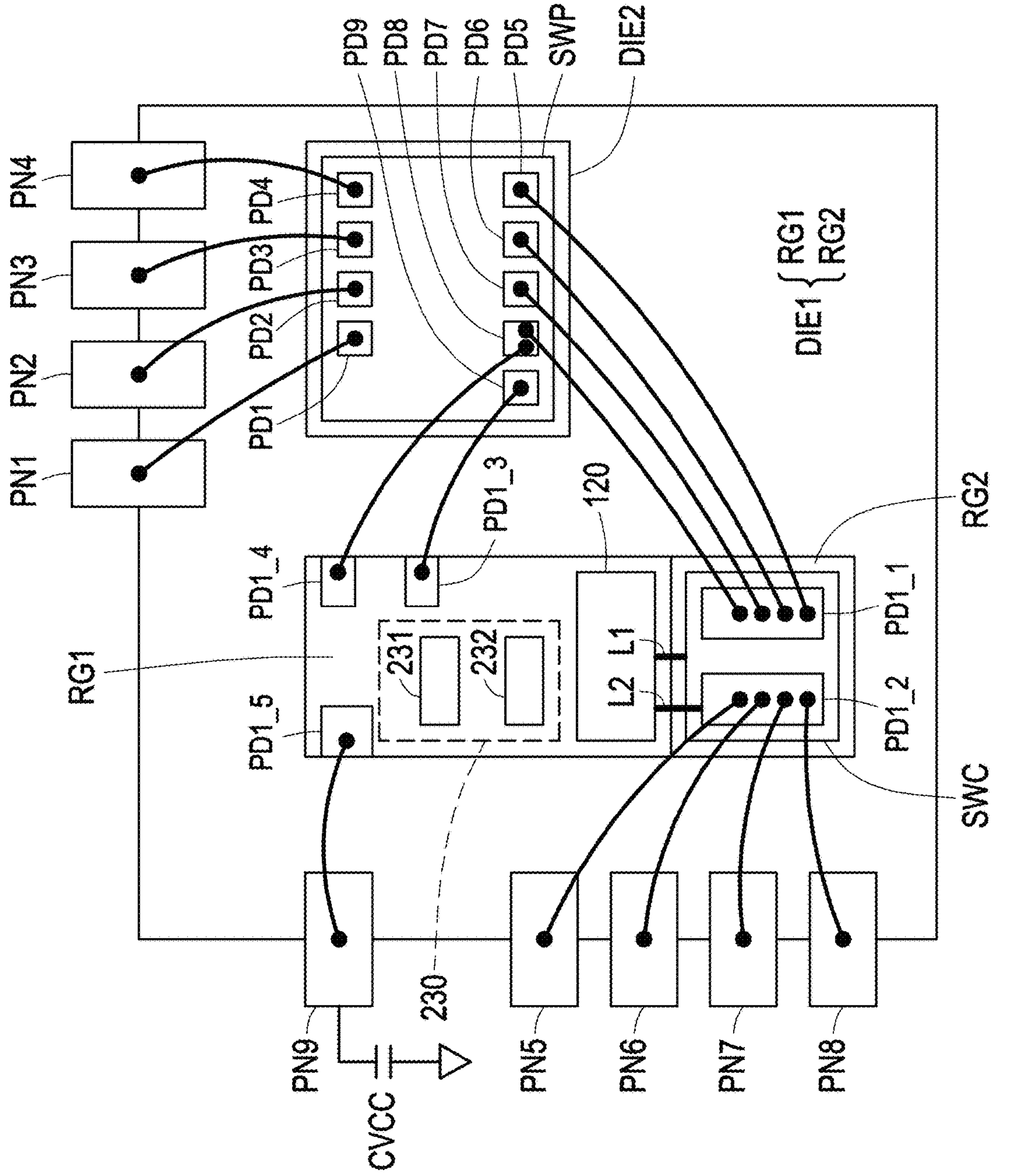
FIG. 9 is a schematic diagram of the die layout of a power conversion device shown according to an embodiment of the invention.

Please refer to FIG. 8 and FIG. 9. FIG. 9 is a schematic diagram of the die layout of a power conversion device shown according to an embodiment of the invention. In the present embodiment, the first die DIE1 at least includes the pads PD1_1 to PD1_5. The second die DIE2 at least includes the pads PD2_1 to PD2_9. The first terminal of the power switch SWP is coupled to the high-voltage terminal HBUS via at least one of the pads PD2_1 to PD2_4 and at least one of the pins PN1 to PN4 of the circuit element. The second terminal of the power switch SWP is coupled to the first terminal of the cascade switch SWC via at least one of the pads PD2_5 to PD2_8 and the pad PD1_1. The second terminal of the cascade switch SWC is coupled to at least one of the pins PN5 to PN8 of the circuit element via the pad PD1_2.

The control circuit 120 may provide the control signal SC to the control terminal of the cascade switch SWC via the electrical connection structure L1 in the first die DIE1. The control circuit 120 is also connected to the pad PD1_2 via the electrical connection structure L2 in the first die DIE1. Therefore, the control circuit 120 may sense the current value flowing through the cascade switch SWC via the second terminal of the cascade switch SWC and the pad PD1_2. The control circuit 120 may perform over-current protection according to sensing the current value flowing through the cascade switch SWC.

The control circuit 120 is coupled to the control terminal of the power switch SWP via the pads PD1_3 and PD2_9. The control circuit 120 provides a bias voltage to turn on the power switch SWP. Such an operation is applicable to the power switch circuit 110 shown in FIG. 2.

In some embodiments, the control circuit 120 may provide the enable signal EN to the control terminal of the cascade switch SWC via the electrical connection structure L1 in the first die DIE1. The control circuit 120 may provide the control signal SC to the control terminal of the power switch SWP via the pad PD1_3 and the pad PD2_9. Such an operation is applicable to the power switch circuit 110 shown in FIG. 3.

In the present embodiment, the second terminal of the power switch SWP may be coupled to the discharge circuit 231 and the charging circuit 232 in the charge and discharge control circuit 230 via the pad PD2_8 and the pad PD1_4. The charging circuit 232 is coupled to the capacitor CVCC via the pad PD1_5 and a pin PN9 of the circuit element.

Based on the above, the power conversion device includes the power switch circuit and the control circuit. The control circuit and the cascade switch in the power switching circuit are integrated in the first die. The power switch in the power switch circuit is integrated in the second die. The withstand voltage capability of the second die is higher than the withstand voltage capability of the first die. The second die is produced by a process rule that meets high withstand voltage capability. The first die is produced by a process rule that meets low withstand voltage capability. Therefore, the charge and discharge control circuit of the invention does not need to be integrated in an additional die. The number of dies in the power conversion device may be reduced. In this way, under the requirement of high voltage, the size of the power conversion device may be reduced.

Although the disclosure has been described with reference to the above embodiments, it will be apparent to one of the ordinary skill in the art that modifications and variations to the described embodiments may be made without departing from the spirit and scope of the disclosure. Accordingly, the scope of the disclosure will be defined by the attached claims not by the above detailed descriptions.

What is claimed is:

1. A power conversion device, comprising:

a power switch circuit, comprising:

a power switch implemented by a depletion-type gallium nitride field-effect transistor, wherein a first terminal of the power switch is coupled to a high-voltage terminal of the power conversion device;

a cascade switch, wherein a first terminal of the cascade switch is coupled to a second terminal of the power switch;

a control circuit coupled to the power switch circuit, wherein the control circuit and the cascode switch are integrated in a first die, wherein the power switch is integrated in a second die, and wherein a withstand voltage capability of the second die is higher than a withstand voltage capability of the first die;

a safety capacitor coupled to the first terminal of the power switch; and a charge and discharge control circuit comprising:

a discharge circuit coupled to the second terminal of the power switch and the control circuit and configured to perform a discharge operation on a voltage value located at the safety capacitor, wherein the discharge circuit is integrated in the first die.

2. The power conversion device of claim 1, wherein the cascade switch is implemented by an enhancement-type field-effect transistor.

3. The power conversion device of claim 1, wherein:

a second terminal of the cascade switch is coupled to a control terminal of the power switch, and a control terminal of the cascade switch is coupled to the control circuit.

4. The power conversion device of claim 3, wherein the control circuit generates a control signal and provides the control signal to the control terminal of the cascade switch.

5. The power conversion device of claim 4, wherein the cascade switch performs a switching operation of the power switch circuit in response to a duty cycle of the control signal.

6. The power conversion device of claim 1, wherein the charge and discharge control circuit further comprises:

a charging circuit coupled to the second terminal of the power switch and the control circuit and configured to perform a charging operation on the voltage value located at the safety capacitor, wherein the charging circuit is integrated in the first die.

7. The power conversion device of claim 1, wherein:

a control terminal of the power switch is coupled to the control circuit, and a control terminal of the cascade switch receives an enable signal.

8. The power conversion device of claim 7, wherein the control circuit generates a control signal and the enable signal and provides the enable signal to the control terminal of the cascade switch.

9. The power conversion device of claim 8, wherein:

the cascade switch is turned on in response to the enable signal, and the power switch performs a switching operation of the power switch circuit in response to the control signal.

* * * * *